Feb. 18, 1936.  J. ARCELON  2,031,448
CIRCUIT CONTROLLER
Filed March 27, 1935  2 Sheets-Sheet 1
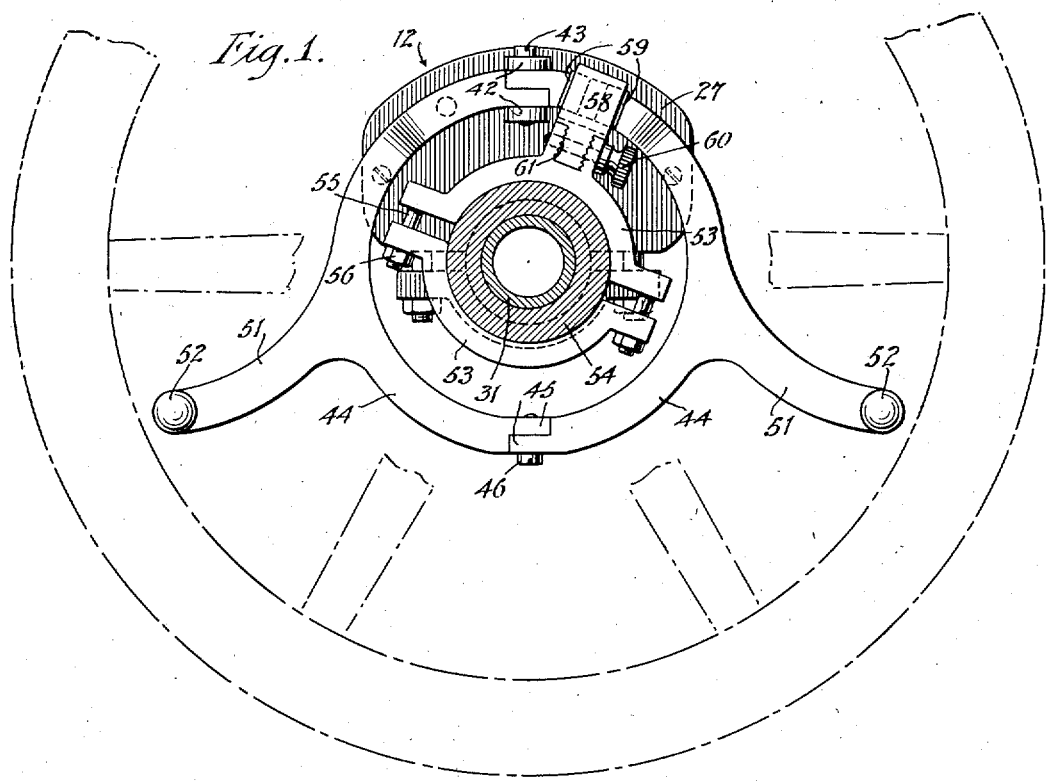
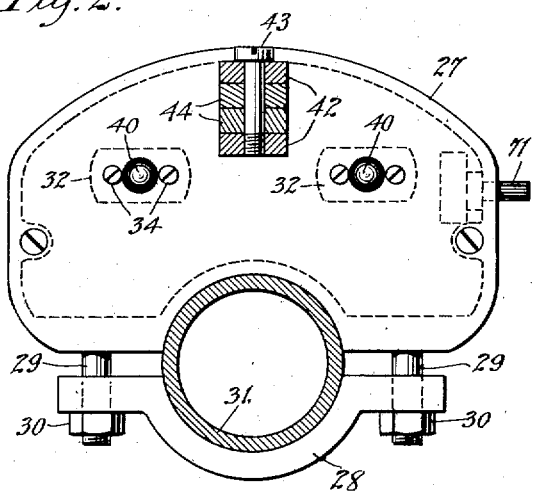
WITNESSES
Edw. Thorpe
D. H. Kane
INVENTOR
John Arcelon
BY
Munn, Anderson & Liddy
ATTORNEYS

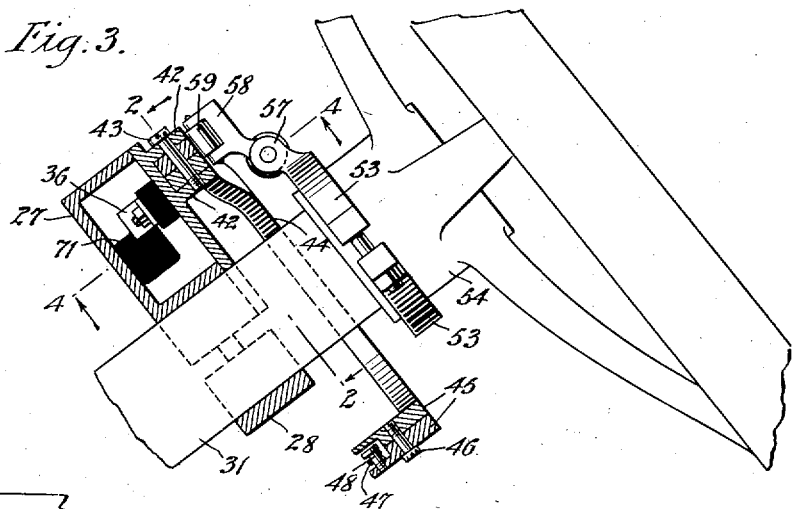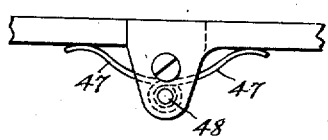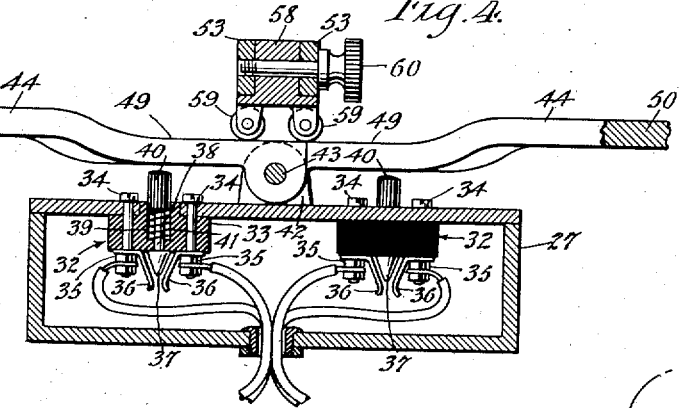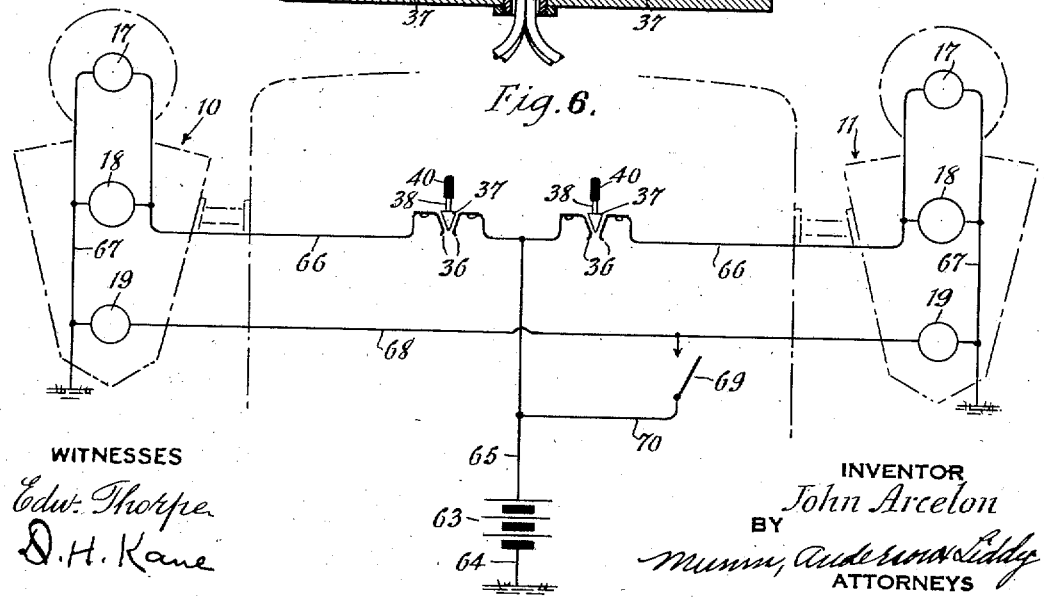

Patented Feb. 18, 1936

2,031,448

UNITED STATES PATENT OFFICE 2,031,448

CIRCUIT CONTROLLER

John Arcelon, Mount Vernon, N. Y.

Application March 27, 1935, Serial No. 13,345

3 Claims. (Cl. 200—59)

This invention relates to circuit controllers adapted for use with signaling apparatus for automobiles, and has for an object the provision of improved apparatus of this character which will greatly add to the safety of automobile driving, especially on highways where there is considerable traffic.

An object of the invention is to provide improved circuit controllers for signaling apparatus which not only may be manually operated but also functions automatically in response to operation of the steering mechanism of an automobile.

With these and other objects in view, reference should be had to the accompanying drawings, in which:

Fig. 1 is a plan view of the signal operating mechanism applied to the steering mechanism of an automobile and showing in dotted lines a portion of the steering wheel;

Fig. 2 is a view in the direction of the arrows on the line 2—2 of Fig. 3 showing the switch box forming part of the signal operating mechanism;

Fig. 3 is a side view partly in section of the signal operating mechanism as applied to the steering spindle of an automobile;

Fig. 4 is a view in the direction of the arrows on the line 4—4 of Fig. 3;

Fig. 5 is a detail view in elevation showing a portion of the trackway forming part of the signal operating mechanism; and Fig. 6 is a diagrammatic representation of the wiring which may be employed in the improved signaling apparatus.

The improved signaling apparatus consists of suitable visible indicators such as units 10 and 11, shown in dotted lines in Fig. 6, and a suitable signal operating device such as the mechanism indicated generally by the numeral 12 for causing the automatic operation of the indicating units in response to the steering of the car, and also providing for the manual operation of the indicating units.

Units 10 and 11 are similar casings which may be of conventional construction having glass faces to permit the passage of light therethrough and which have disposed therein three electric light bulbs indicated by the numerals 17, 18 and 19. In operation the indicating units should be secured to the outside of the car in positions which are clearly visible to pedestrians and to the drivers of other cars. Thus the unit 10 may be positioned on the left hand side of the car adjacent the windshield and approximately at the level of the top of the car, while the unit 11 may be placed on the right hand side of the car in a corresponding position.

The signal operating unit 12 which controls the operation of the indicators consists in part of a switch box 27 having a clamping member 28 secured thereto as by means of the bolts and nuts 29 and 30 respectively, and is preferably secured around the stationary cylindrical casing 31 which surrounds the steering spindle of the automobile at a short distance below the steering wheel.

In the switch box 27 are a pair of switches 32 spaced a short distance apart and positioned so that when the switch box is secured around the casing of the steering spindle, as shown, the switches will be in front of and slightly to either side of the steering spindle. Each switch is preferably formed of a body 33 of non-conducting material connected by means of the bolts and nuts 34 and 35 to the top of the switch box and having the spring metal contact points 36 likewise held in position by means of the bolts and nuts 34 and 35. The contact points 36 are spaced slightly apart and a circuit maker and breaker consisting of a conical metallic member 37 secured to the end of a plunger 38, extending through the central opening 39 formed in the switch body, may be shifted by pressing downwardly on the handle member 40 made of non-conducting material to close the circuit between the two contact points. A spring 41 normally urges the member 37 upwardly, thereby keeping the circuit open.

On the top of the switch box 27 at its forward end a pair of upstanding ears 42 are formed, to which are pivoted as by means of a bolt or pin 43 a pair of generally arc-shaped trackways 44 which extend around the steering spindle of the automobile and are pivotally secured together at their opposite ends by means of the bolt 46. The trackways are so arranged that each may have independent pivotal movement. However, a spring 47 secured around the pin 48 adjacent the end 45 of one of the trackways, presses against the undersurface of the trackways and normally holds them in the position indicated in the drawings at an angle of 180° with respect to each other, as more specifically shown in Fig. 5. The trackways are formed so that different portions are disposed in different planes forming dwell and rest portions. Thus adjacent the forward end of the trackways they are formed with the rest portions 49 and on the side and rear of the steering spindle the trackways are formed with the dwell portions 50 disposed in a higher plane than the rest portions.

The handle 40 of one of the switches 32 extends upwardly beneath one of the trackways 44, while the handle of the other switch extends upwardly beneath the other trackway, so that when the trackways are pivoted downwardly they engage the handles 40 of the switches, forcing them downward and completing the circuits between the contact points 36.

Manually operated means are preferably provided for operating the switches and to this end each of the trackways 44 are provided with laterally extending members 51 having handle portions 52 secured to the end. The members 51 are of such a length that the driver of the car, without removing a hand from the steering wheel, may press downwardly on either of the handles 52, causing the operation of either of the switches 32 as desired.

To cause the automatic operation of the switches I provide a member rotatable with the steering spindle and riding on the trackway 44 to cause the automatic depression of either segment of the trackway as the steering spindle is rotated. This device consists of the circular clamping members 53 secured around the rotatable hub portion of the steering wheel 54 as by means of the bolts and nuts 55 and 56 and the follower 58 adjustably connected to the projecting ears 57 formed on the clamping member 53 and which is provided with a pair of rollers 59 riding on the trackways 44. The connection between the follower 58 and the ears 57 consist of a bolt provided with a knurled handle 60. The inner faces of the two ears and the connecting portion of the follower are preferably toothed as clearly shown at 61 in Fig. 1, so that the follower may be adjusted to ride properly on the trackways 44 and then be securely held in position by tightening the bolt by means of the knurled handle 60. The follower may be pivoted upwardly to inoperative position out of engagement with the trackway, when desired, and the indicators will then be unaffected by rotation of the steering wheel.

The electrical wiring is shown in Fig. 6 and consists of a suitable source of current supply 63 grounded at one side by the wire 64 and connected by means of wires 65 to one of the contact strips 36 in each of the switches 32. The other contact strip 36 in each of the switches is connected by means of wires 66 to one of the contacts of each of the bulbs 17 and 18 in the indicating units 10 and 11 respectively. The other contacts of the bulbs 17 and 18 in each of the units and one of the contacts of bulb 19 are grounded by means of wires 67. The second contact of each of the bulbs 19 are connected by means of wires 68 to a manually operated switch 69 which is connected to the source of current supply by wires 70 and 65. The switch 69 may be disposed in the switch box 27 and operated by means of a handle 71 projecting from the side thereof as shown in Fig. 2. By operation of the handle 71 the switch 69 will be closed, completing the circuit to the two bulbs 19 in the lowest compartments of the signaling units, causing them to light. These lights may be used as parking lights or may be used in driving to more clearly indicate to other drivers the position of the two sides of the car.

When a driver is about to make a right turn he may press down upon the handle 52 on the side towards which he is going to turn, causing the trackway 44 to press down upon the handle 40 of the switch 32 which operates to close the circuit between the contacts 36, which in turn will cause the bulbs 17 and 18 disposed in the unit on the side of the car towards which the turn is to be made to light, showing both a red light and a green arrow pointing in the direction of the intended turn. The driver need not manually operate the handles 52, however, for the mere rotation of the steering wheel causes the follower 58 to rotate, the rollers traveling on the segment of the trackway 44 on the side of the car towards which the turn is being made. As the follower travels over the rest portion of the trackway it will have no effect upon the switches or indicators but when the follower reaches the dwell portion 50 of the trackway it will depress the trackway, causing the operation of the switch and of the lights 17 and 18 in the unit on the side of the car towards which the turn is being made.

Because of the provision of the rest portion 49 the indicators will not be operated by any minor rotation of the steering wheel such as is required in passing another car or in following the normal curvature of a road

What I claim is:

1. In a signaling apparatus for an automobile, a signal operating device comprising a pair of independent pivotally mounted arc-shaped trackways disposed around the steering spindle of the automobile, a pair of independent switches each located adjacent one of said trackways and cooperable to be operated thereby and a member rotatable with said spindle and slidable along said trackways, said trackways having portions disposed in different planes so that the trackways are caused to shift pivotally during different periods of rotation of said spindle so as to operate the switches.

2. In a signaling apparatus for an automobile, a signal operating device comprising a pair of switches mounted adjacent the steering spindle of the automobile, a pair of independent pivotally mounted segmental trackways disposed around said spindle above said switches and fixed against rotation with said spindle, each of said trackways being cooperable to operate one of said switches when in depressed position, means for normally holding said trackways in elevated position, and a member rotatable with said spindle and slidable along said trackways, said trackways having dwell portions and rest portions so as to cause the depression of the trackways and operation of the switches during different periods of rotation of the spindle.

3. In a signaling apparatus for automobiles, a signal operating device comprising a pair of independent segmental control members fixed against rotation, each of said members extending substantially half-way around the steering spindle of the automobile and providing on their upper surfaces a continuous trackway having portions in different horizontal planes and each member being pivotally mounted so as to have limited relative movement from depressed to elevated position, a pair of switches mounted adjacent said control members and positioned so as to be operated by said control members when in depressed position, means for normally holding said control members in elevated position, a rigid arm rotatable with the spindle and slidable along said trackway so as to cause operation of said switches during certain periods of rotation of said spindle, and laterally extending operating levers secured to each of said control members positioned adjacent the steering wheel of the automobile for manually operating the switches.

JOHN ARCELON.